United States Patent
Palaniappan et al.

(10) Patent No.: US 6,630,567 B1
(45) Date of Patent: Oct. 7, 2003

(54) PROCESS FOR THE PREPARATION OF POLYANILINE SALT

(75) Inventors: Srinivasan Palaniappan, Andhra Pradesh (IN); Anbalagan Amarnath Chellachamy, Andhra Pradesh (IN)

(73) Assignee: Council of Scientific and Industrial Research, New Delhi (IN)

( * ) Notice: Subject to any disclaimer, the term of this patent is extended or adjusted under 35 U.S.C. 154(b) by 42 days.

(21) Appl. No.: 10/098,188

(22) Filed: Mar. 13, 2002

(51) Int. Cl.[7] ............................................... C08G 73/00
(52) U.S. Cl. ...................... 528/422; 528/486; 528/487; 528/491; 528/495; 528/497; 528/499; 528/501; 528/502 R; 528/503
(58) Field of Search ................................. 528/422, 486, 528/487, 491, 495, 497, 499, 501, 502 R, 503

(56) References Cited

U.S. PATENT DOCUMENTS

| | | | |
|---|---|---|---|
| 5,276,112 A | | 1/1994 | MacDiarmid et al. |
| 5,567,356 A | | 10/1996 | Kinlen |
| 5,840,214 A | * | 11/1998 | Kinlen |
| 6,228,492 B1 | * | 5/2001 | Kinlen et al. |

FOREIGN PATENT DOCUMENTS

| | | |
|---|---|---|
| EP | 0362378 A1 | 4/1990 |
| EP | 0579027 A1 | 1/1994 |
| WO | WO 93/22775 | 11/1993 |

* cited by examiner

*Primary Examiner*—Duc Truong
(74) *Attorney, Agent, or Firm*—Nixon & Vanderhye P.C.

(57) ABSTRACT

The present invention provides a process for preparing electrically conductive polyaniline salts in various organic solvents using cost-effective protonic acids and where the solution is optically transparent.

8 Claims, No Drawings

PROCESS FOR THE PREPARATION OF POLYANILINE SALT

FIELD OF THE INVENTION

The present invention relates to a process for the preparation of a polyaniline salt in organic solvents. More particularly, the present invention relates to a process for preparing electrically conductive polyaniline salts in various organic solvents using cost-effective protonic acids and where the solution is optically transparent.

BACKGROUND OF THE INVENTION

A lot of research work in the area of electrically conductive polymers is being carried out at the moment all over the world. These polymers make it possible to replace metallic conductors and semi-conductors in many applications such as batteries, transducers, switches, solar cells, circuit boards, heating elements and in electrostatic discharge (ESD) and electromagnetic interference shielding (EMI) applications. The advantages of electrically conductive polymers compared to metals are, for instance, their low weight, good mechanical properties, resistance to corrosion and cheaper synthesis and processing methods.

Examples of kinds of inherently electrically conductive polymers are polyacetylene, poly-p-phenylene, polypyrrole, polythiophene and polyaniline. An advantage with an inherently electrically conductive polymers is that its electrical conductivity is easily varied as a function of the doping time, which is especially seen in the case of low conductivities. It is difficult to obtain low conductivities for filled electrically conductive plastics.

Polyaniline has emerged as one of the promising conducting polymers and can be used in a variety of applications, such as paint, anti-static protection, electromagnetic protection, electro-optic devices such as liquid crystal devices (LCDs) and photocells, transducers, circuit boards, etc. However, processing of polyaniline into useful products or devices as described above has been problematic because of its insolubility in common solvents.

Synthesis of polyaniline is commonly performed by the method of chemical oxidative polymerization based upon the aqueous solution polymerization system. (see Cao et al., Polymer, 30:2305, 1989). Typically, polyaniline is produced as solid emeraldine salt from chemical oxidative polymerization in the presence of protonic acids such as HCl and $H_2SO_4$. The polyaniline obtained in such way is normally insoluble, which hinders the application of the polyaniline.

Smith et al., U.S. Pat. No. 5,470,505, disclosed that the emeraldine salt prepared by standard methods of oxidative polymerization of aniline monomer in the presence of a protonic acid can be dissolved in an acid, particularly, in strong acids such as concentrated $H_2SO_4$, $CH_3SO_3H$, $ClSO_3H$, $CF_3SO_3H$ and $HNO_3$ (70% or fuming). The emeraldine salt (polyaniline) dissolved in one of these acid solutions is then processed into desired articles for various applications.

Abe et al., U.S. Pat. No. 5,728,321, disclosed that a solution of polyaniline (dissolved in an aprotic polar solvent, such as N-methyl-2-pyrrolidone) in doped state can be obtained by a method using a specific protonic acid, such as hydrofluoroboric acid, hydrofluorophosphoric acid, perchloric acid, or any other organic acids having acid dissociation constant pKa values of less than 4.8, as dopants in the oxidative polymerization of aniline monomer. Also, the polyaniline obtained according to the above method, which is insoluble in an organic solvent, can be dissolved in an aprotic polar solvent, when the polyaniline is in an undoped state. The undoping of doped polyaniline in order to permit the polyaniline to be soluble in organic solvent is burdensome and increases the production cost.

To improve the processability, emulsion polymerization processes for preparing a polyaniline salt of a protonic acid have been reported. (Cao et al., U.S. Pat. No. 5,232,631, Example 6B, 1993; Cao and Jan-Erik, WO94/03528, 1994 I; Cao and Jan-Erik, U.S. Pat. No. 5,324,453, 1994 II; see also, Osterholm et al., P. Synthetic Metals 55:1034–9, 1993). In these disclosures aniline, a protonic acid, and an oxidant were combined with a mixture of polar liquid, typically water and a non-polar or weakly polar liquid, e.g. xylene, chloroform, toluene, decahydronaphthalene and 1,2,4-trichlorobenzene, all of which are either sparingly soluble or insoluble in water.

Smith et al (Polymer 35, 2902, (1994)) reported the polymerization of aniline in an emulsion of water and a non-polar or weakly polar organic solvent. This polymerization was carried out in the presence of a functionalized protonic acid such as dodecylbenzenesulfonic acid, which simultaneously acted as a surfactant and protonating agent for the resulting polyaniline. The resultant polyaniline has a good solubility in non-polar solvents. Protonic acid primary dopants are described as acting as surfactants because they are purportedly compatible with organic solvents and also enable intimate mixing of the polyaniline in bulk polymers (Cao et al, Synthetic Metals 48:91–97, 1992; Cao et al, U.S. Pat. No. 5,232,631, 1993 which are incorporated by reference). Thus, any surfactant aspect of the primary dopants was thought to contribute to the processability rather than the conductivity of the polyaniline.

Heeger's group (Synthetic Metals 48, 91, 1992); Synthetic Metals 3514 (1993) reported that emeraldine base doped with a functionalized protonic acid, for example, camphorsulfonic acid and dodecylbenzene sulfonic acid, can be dissolved in a non-polar or moderately-polar organic solvent. This three component system has good solubility in common organic solvents and is compatible with many of the classical polymers.

In our pending Indian patent application No. 1029/DEL/2000, a process for preparation of polyaniline salts is reported. The polyaniline salt is in a carrier organic solvent such as chloroform, dichloromethane, toluene and the solution is optically transparent. Polyaniline salt in carrier organic solvent was prepared via emulsion polymerization pathway by oxidizing aniline to polyaniline salt using benzoyl peroxide as oxidizing agent (benzoyl peroxide is soluble in the above mentioned solvents i.e., chloroform, dichloromethane, toluene).

Benzoyl peroxide is not soluble in most of the other organic solvents such as propanol, butanol, decanol, dodecanol, cyclohexanol, dioctyl phthalate etc. and therefore, emulsion polymerization method for the preparation of polyaniline salt can not be carried out using benzoyl peroxide in the above solvents.

OBJECTS OF THE INVENTION

The main object of the present invention is to provide a process for the preparation of polyaniline salts in organic solvents such as N,N-dimethylformamide, dimethyl sulfoxide, N-methyl-2-pyrrolidone, butanol, decanol, dodecanol, cyclohexanol, methylcyclohexane and dioctyl phthalate.

The other object of the present invention is to provide a process for the preparation of electrically conducting polyaniline salt in various organic solvents using cost-effective protonic acid such as sulfuric, nitric, hydrochloric acid.

The further object of the present invention is to provide for a process for preparation of polyaniline salt soluble in organic solvents for improved processibility.

These and other objects of the invention are achieved and the problems associated with the prior art are overcome by the process of the invention described in detail below.

SUMMARY OF THE INVENTION

In the present invention, a process for preparation of polyaniline salts in various organic solvents such as N,N-dimethylformamide, dimethyl sulfoxide, N-methyl-2-pyrrolidone, butanol, decanol, dodecanol, cyclohexanol, methylcyclohexane and dioctyl phthalate has been developed. Accordingly, the process in the present invention comprises of polymerizing aniline in the presence of a mixture of aqueous and hydrocarbon solvent and in the presence of an anionic or a cationic surfactant and radical initiator at a temperature ranging between 30° C. to 40° C. for at least 24 hours, separating the polyaniline salt in the hydrocarbon solvent by conventional method from the reaction mixture. The hydrocarbon solvent containing polyaniline salt is then mixed with other organic solvents and thereupon the hydrocarbon solvent is evaporated, obtaining polyaniline salt in various organic solvents.

In an embodiment of the present invention, the hydrocarbon solvent used is a chlorinated solvent such as dichloromethane, chloroform.

In another embodiment of the present invention, the anionic surfactant used is selected from sodium lauryl sulfate, dioctyl sodium sulfosuccinate and the cationic surfactant used is cetyltrimethylammonium bromide.

In yet another embodiment of the present invention, the radical initiator used is benzoyl peroxide.

In still yet another embodiment of the present invention, the protonic acid used is selected from sulfuric acid, nitric acid, hydrochloric acid.

In still yet another embodiment of the present invention, the organic solvent used is selected from a group consisting of benzene, toluene, xylene, 1,2-dichlorobenzene, nitro benzene, N,N-dimethylformamide, dimethyl sulfoxide, N-methyl-2-pyrrolidone, butanol, decanol, dodecanol, cyclohexanol, methylcyclohexane and dioctyl phthalate.

In a feature of the present invention, the separation of polyaniline salt in organic solvent may be effected by pouring the reaction mixture into water.

In another feature of the invention, the separation of the polyaniline salt from the reaction mixture may be carried out by filtration.

DETAILED DESCRIPTION OF THE INVENTION

Polyaniline is today one of the most promising conducting polymers and has a wide applicability. Synthesis of polyaniline is normally carried out by the method of chemical oxidative polymerization in the presence of protonic acids such as HCl and $H_2SO_4$ based upon the aqueous polymerization system. Usually polyaniline is produced as a solid emeraldine salt, and polyaniline obtained is such way is normally insoluble, which hinders the application of polyaniline. Even if the salt is processed in a manner so that it is soluble in a few solvents the method and the reactants used are not cost-efficient.

The present invention relates to a process wherein the polyaniline produced is soluble in organic solvents and the process utilizes cost-efficient protonic acids. The process comprises of polymerizing aniline in the presence of a mixture of an aqueous and a hydrocarbon solvent and in the presence of an anionic or a cationic surfactant and radical initiator at a temperature ranging between 30° C. to 40° C. for a period of at least 24 hours, followed by separating the polyaniline salt in the -hydrocarbon solvent by conventional method such as filtration from the reaction mixture. It also may be separated out by pouring the reaction mixture into water. The hydrocarbon solvent containing polyaniline is then mixed with other organic solvents and the hydrocarbon solvent is evaporated, resulting in the polyaniline salt in an organic solvent.

The invention will now be described in greater detail with reference to the following examples, which are illustrative and therefore should not be construed as limiting the scope of the present invention in any manner:

EXAMPLE 1

The following example illustrates the preparation of polyaniline salts.

Sodium lauryl sulfate (2.0 g) is dissolved in 40 ml of distilled water and mixed with a solution containing 4.85 g benzoyl peroxide in 60 ml dichloromethane. The milky-white emulsion thus formed is mechanically stirred at 35° C. Solution containing aniline (2.4 ml) and sulfuric acid (6.0 ml) in 100 ml of water is added dropwise to the above mixture over a period of approximately 20 minutes. The reaction is allowed to proceed for 24 hours. The color of the emulsion at this time becomes green. The reaction mixture is separated into two layers, separated the bottom oily green phase containing the polyaniline salt and a upper aqueous phase. The upper aqueous phase is removed with a separating funnel and 1500 ml water is added to the green phase, again the aqueous phase is removed and the green polyaniline salt phase is subsequently washed three times with 1500 ml portions of water. Sodium sulfate (5 g) is added to the polyaniline phase and filtered through filter paper. The polyaniline phase thus obtained is appeared to be uniform to the naked eye and the polymer remained solubilized in the organic phase.

Using the above procedure, polyaniline salt systems may also be prepared by using the following variables (1) Hydrochloric acid (18 ml) instead of sulfuric acid (2) Nitric acid (12 ml) instead of sulfuric acid (3) Dioctyl sodium sulfosuccinate (2.0 g) instead of sodium lauryl sulfate (4) Cetyltrimethylammonium bromide (2.0 g) instead of sodium lauryl sulfate (5) Chloroform solvent (60 ml) instead of dichloromethane

EXAMPLE 2

The following example illustrates the preparation of the polyaniline salts in various ganic solvents.

Polyaniline salt in dichloromethane or chloroform solution (1 ml) prepared using Example 1 is added to 9 ml of dichloromethane and this solution is mixed with 10 ml of N-methyl-2-pyrrolidone. The solvent dichloromethane is evaporated using Rotavapor and polyaniline salt is transferred to N-methyl-2-pyrrolidone. The solubility of the polyaniline salt in N-methyl-2-pyrrolidone is checked and found to be optically transparent.

TABLE 1

Solubility of polyaniline salt in various organic solvents

| Sl. No. | Solvents | Solubility |
|---|---|---|
| 1 | Benzene | Soluble |
| 2 | Toluene | Soluble |
| 3 | Xylene | Soluble |
| 4 | Chlorobenzene | Soluble |
| 5 | 1,2-dichloro benzene | Soluble |
| 6 | Nitro benzene | Soluble |
| 7 | N,N-Dimethylformamide | Soluble |
| 8 | Dimethyl sulfoxide | Soluble |
| 9 | N-methyl-2-pyrrolidone | Soluble |
| 10 | Butanol | Soluble |
| 11 | Decanol | Soluble |
| 12 | Dodecanol | Soluble |
| 13 | Cyclohexanol | Soluble |
| 14 | Methyl cyclohexane | Soluble |
| 15 | Dioctyl phthalate | Soluble |
| 16 | Ethylene glycol | Not soluble |
| 17 | Tetrahydrofuran | Not soluble |
| 18 | 2-butoxy ethanol | Not soluble |
| 19 | Methanol | Not soluble |
| 20 | Ethanol | Not soluble |
| 21 | Isoamyl alcohol | Not soluble |
| 22 | Paraffin oil | Not soluble |

EXAMPLE 3

The following example illustrates the process for the maximum solubility of the polyaniline salts in various solvents.

Polyaniline salt in dichloromethane solution (known amount) is added in to known amount of dichloromethane (the amount of polyaniline salt in dichloromethane is varied from 1 ml to 10 ml in steps of 1 ml and the total volume of dichloromethane is kept at 10 ml) and this solution is mixed with 10 ml of N-methyl-2-pyrrolidone. The solvent dichloromethane is evaporated using Rotavapor and polyaniline salt is transferred to N-methyl-2-pyrrolidone. The solubility of the polyaniline is checked and found to be optically transparent. Similar procedure was used for other test solvents.

TABLE 2

Maximimum solubility of polyaniline salt in various solvents

| Sl. No. | Solvents | Maximum amount of polyaniline salt in 10 ml of solvent |
|---|---|---|
| 1 | Benzene | 8 ml |
| 2 | Toluene | 8 ml |
| 3 | Xylene | 8 ml |
| 4 | Chlorobenzene | 6 ml |
| 5 | 1,2-dichloro benzene | 6 ml |
| 6 | Nitro benzene | 6 ml |
| 7 | N,N-Dimethylformamide | 4 ml |
| 8 | Dimethyl sulfoxide | 6 ml |
| 9 | N-methyl-2-pyrrolidone | 6 ml |
| 10 | Butanol | 2 ml |
| 11 | Decanol | 2 ml |
| 12 | Dodecanol | 2 ml |
| 13 | Cyclohexanol | 2 ml |
| 14 | Methyl cyclohexane | 4 ml |
| 15 | Dioctyl phthalate | 4 ml |

EXAMPLE 4

The following example illustrates the preparation of the polyaniline salts in mixture of various solvents.

Polyaniline salt in dichloromethane solution (known amount) was added in to known amount of dichloromethane (total volume 10 ml) and this solution was mixed with 10 ml of N-methyl-2-pyrrolidone. The solubility of the polyaniline salt in the mixture of solvents is checked and found to be optically transparent. Similar procedure was used for other test solvents.

EXAMPLE 5

The following example illustrates the electronic absorption results of the polyaniline salts in various solvents.

The isolated polyaniline salt samples are analyzed by electronic absorption spectral technique using Hitachi U 2000 spectro photo meter. Electronic absorption spectra of polyaniline salt in organic solvent according to Examples 1–3 are recorded and three peaks are observed at around 325–380, 450–540 and 700–850 nm which corresponds to polyaniline salt system.

EXAMPLE 6

The following example illustrates the preparation of the polyaniline salt in the powder form by the emulsion polymerization pathway.

The organic layer obtained in Example 1 which contains polyaniline salt in organic solvent is poured into 500 ml of acetone. Polyaniline salt is thus precipitated out from the organic solvent. The precipitate is then recovered by filtration and the solid is washed with 2000 ml of distilled water followed by 250 ml of acetone. The powder is dried at 100° C., till the constant mass is reached.

The polyaniline salts in the dry powder form are compressed into pellets using a 16 mm diameter Macro-Micro KBr die and a 12-ton laboratory hydraulic press. The powder is placed in the die and a pressure of 2000 lbs is applied. Each pellet thus formed is measured to determine its diameter and thickness. The pellets are in the shape of disks. In measuring the conductivity a pellet is coated with silver paint on both the sides having the same cross sectional area and the resistance is measured using an ohmmeter. Lead resistance is 0.03 Ohms for the pellets. Conductivity is calculated using the following formula:

$$\text{Conductivity} = (\text{Thickness})/(\text{resistance} \times \text{area}) = d(RA)$$

The conductivity of the polyaniline salt prepared with different acids such as sulfuric, nitric, and hydrochloric acid is found to be 0.1, 0.2, and 0.1 S/cm respectively.

We claim:

1. A process for the preparation of a polyaniline salt comprising
   (a) polymerizing aniline in the presence of mixture of aqueous and a hydrocarbon solvent, a protonic acid and a radical initiator at a temperature ranging between 30° C. to 40° C. for a period of at least 24 hours;
   (b) separating the polyaniline salt in the hydrocarbon solvent from the reaction mixture;
   (c) mixing the hydrocarbon solvent containing polyaniline salt with one or more other organic solvent; and
   (d) evaporating the hydrocarbon solvent, and obtaining polyaniline salt.

2. A process as claimed in claim 1, wherein the protonic acid is selected from the group consisting of sulfuric acid, nitric acid and hydrochloric acid.

3. A process as claimed in claim 1, wherein the hydrocarbon solvent used in step (b) is a chlorinated solvent selected from dichloromethane and chloroform.

4. A process as claimed in claim 1 wherein the polymerisation is carried out in the presence of an anionic surfactant or a cationic surfactant.

5. A process as claimed in claim 4, wherein the anionic surfactant used is selected from sodium lauryl sulfate and dioctyl sodium sulfosuccinate.

6. A process as claimed in claim 4 wherein the cationic surfactant is cetyltrimethylammonium bromide.

7. A process as claimed in claim 1, wherein the radical initiator used is benzoyl peroxide.

8. A process as claimed in claim 1, the solvent used is selected from the group consisting of benzene, toluene, xylene, chlorobenzene, 1,2-dichlorobenzene, nitro benzene, dimethyl sulfoxide, N-methyl-2-pyrrolidone, butanol, decanol, dodecanol, cyclohexanol, methylcyclohexane, dioctyl phthalate and any mixture thereof.

* * * * *